United States Patent [19]

Edward et al.

[11] Patent Number: 4,885,589
[45] Date of Patent: Dec. 5, 1989

[54] OPTICAL DISTRIBUTION OF TRANSMITTER SIGNALS AND ANTENNA RETURNS IN A PHASED ARRAY RADAR SYSTEM

[75] Inventors: Brian J. Edward, Jamesville; Stephen Wanuga, Liverpool, both of N.Y.

[73] Assignee: General Electric Company, Syracuse, N.Y.

[21] Appl. No.: 244,162

[22] Filed: Sep. 14, 1988

[51] Int. Cl.[4] .......................... G01S 13/00; H01Q 3/34
[52] U.S. Cl. .................................... 342/175; 342/368
[58] Field of Search ................................ 342/175, 368

[56] References Cited

U.S. PATENT DOCUMENTS 4,258,363  3/1981  Bodmer et al. .................... 342/368

OTHER PUBLICATIONS

Crystal Technology, Inc., "OGW Traveling-Wave 2×2 Switch With and Without Fiber Optic Pigtails", pp. 2-4;
Crystal Technology, Inc., "OGW 2×2 Switch With and Without Fiber Optic Pigtails for High-Speec Switching of Light".
Journal of Electrical and Electronics Engineering, Australia—IE Aust. & IREE Aust., vol. 6, No. 4, "Integrated Electro-Optic Modulators and Switches", Dec. '86, P. S. Chung, pp. 308-320.
Journal of Lightwave Technology, vol. LT-5, No. 3, Mar. 1987, "System Characteristics of Direct Modulated and Externally Modulated RF Fiber-Optic Links", W. E. Stephens, T. R. Joseph, pp. 380-387.
GEC Journal of Research, vol. 2, No. 2, 1984, "Integrated Optical Components for Phased Arrays", N. J. Parsons, pp. 76-81.
SPIE vol. 477 Optical Technology for Microwave Applications (1984), "Transmitter and Receiver Design for Microwave Fiber Optic Links", H. Blauvelt and H. Yen, pp. 44-51.

Primary Examiner—Thomas H. Tarcza
Assistant Examiner—Gilberto Barrón, Jr.
Attorney, Agent, or Firm—Richard V. Lang; Fred Jacob; Robert A. Cahill

[57] ABSTRACT

The invention relates to the distribution of radio frequency signals using optical fibers between a centrally located radar transmitter/receiver and remotely located transmit/receive modules associated with the elements of an active phased array. The invention avoids the need for remotely located lasers, by using the optical carrier generated at the central location for both transmission, when it is modulated by the transmitter and supplied to each T/R module over an optical path; and for reception, when it is supplied to each T/R module unmodulated. An optical switch and an optical modulator in the T/R module permit the antenna return to be converted to an optical format for supply over a second optical path to the central receiver. The arrangement may be further simplified by selecting a simple optical device to perform both the optical switching and optical modulation function in each T/R module.

6 Claims, 6 Drawing Sheets

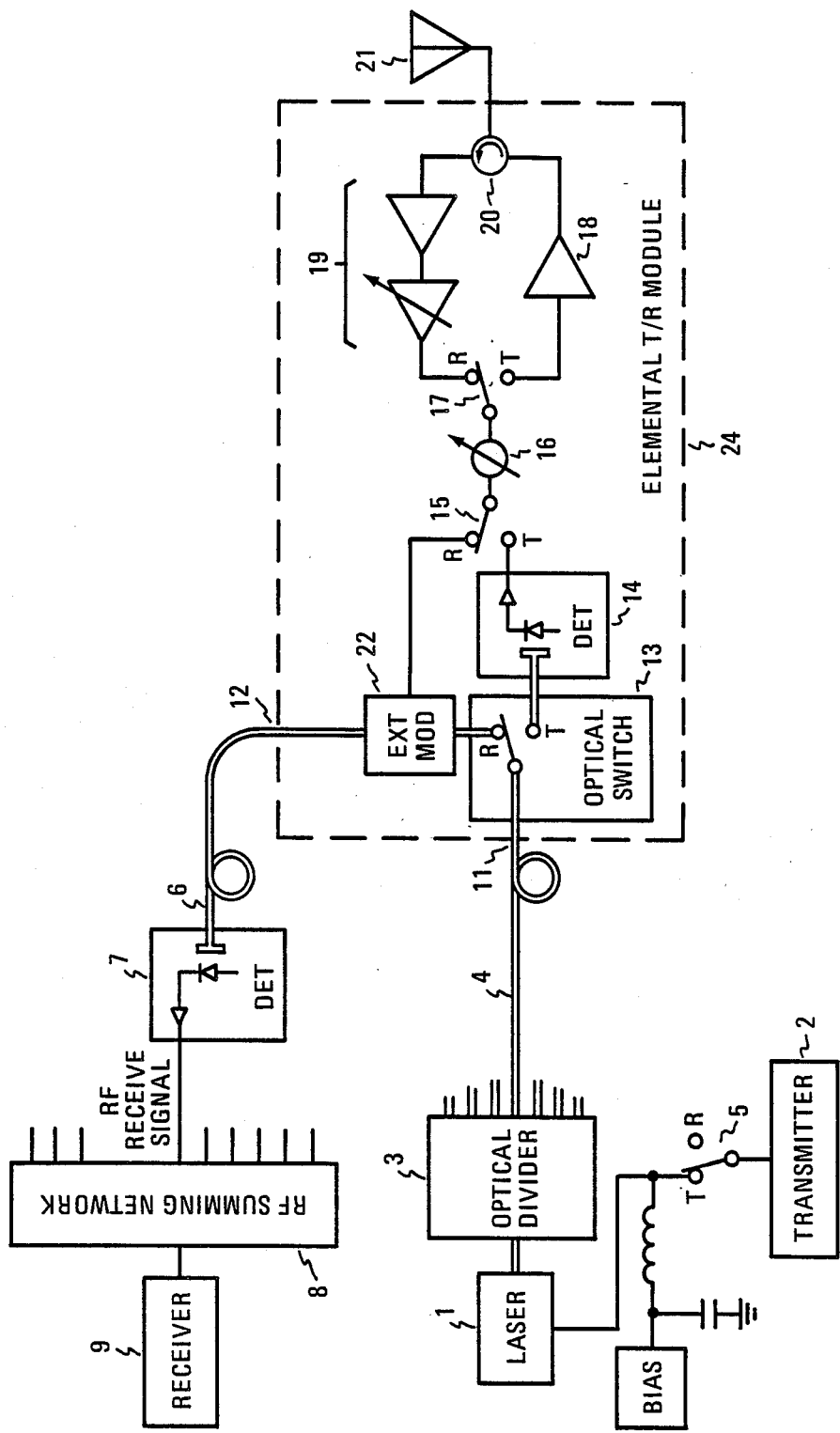

OPTICAL DISTRIBUTION OF TRANSMITTER SIGNALS AND ANTENNA RETURNS IN A PHASED ARRAY RADAR SYSTEM

BACKGROUND OF THE INVENTION

1. Field of the Invention

The invention relates to the distribution of radio frequency signals using optical fiber links between a centrally located radar transmitter/receiver and a plurality of remotely located transmit/receive modules, each module being associated with an individual antenna element. Optical signal distribution, which maintains accurate phase relationships between distributed signals, has particular application to arrays requiring a low profile or reduced weight as in airborne applications.

2. Prior Art

The fiber optic distribution of RF signals is of advantage in airborne phased array radar systems. In a conventional arrangement, the RF signal modulates a locally generated optical carrier at the sending end of the distribution link. The modulated carrier is then coupled by an optical fiber to the receiving end of the link where the RF signal is recovered by an optical detector. For two-way communication, two optical sources, two means for modulating the sources, and two optical detectors are required. The optical fiber is of low loss, is immune to electromagnetic pulse (EMP) and exhibits low channel-to-channel cross coupling. Optical fibers are mechanically flexible, small in size, and light in weight, giving this method of signal transmission an advantage in airborne applications.

Present day phased array radar systems comprise a transmitter, receiver, beamformer, signal processor, display, power supplies, and an operator console which are centrally located and a large number of transmit/receive modules which are at some distance from the central location and in close association with the antenna elements making up the array. The active electronic device of such radar systems are solid state devices configured as discrete devices on printed circuit boards, integrated circuits, hybrid integrated circuits, monolithic microwave integrated circuits, also leading to small, light weight electronics ideal for airborne applications.

Proposed signal distribution systems for phased array radar systems employ laser or light emitting diodes as the modulated optical sources. During transmission, modulated light signals which are generated at the central location, are sent via optical fibers to the remote T/R modules. The T/R module includes detectors such as PIN diodes or photo diodes which recover the transmit signal from the optical carrier and RF amplifiers which amplify the transmit signal to a power level suitable for driving the antenna elements of the array.

The T/R modules also contain low noise amplifiers for amplifying the radar return, light sources for providing an optical carrier and a means for modulating the optical carrier with the receive signal. During reception, the optically formatted receive signal is conveyed by an optical fiber from the T/R modules to the central location where detection, beamforming and signal processing occur.

T/R modules are plentiful in a phased array radar system. The radar system typically requires one T/R module for each antenna element in the array. Since the antenna elements number in the hundreds or thousands, depending upon the complexity of the array, each radar system, depending on complexity, requires hundreds or thousands of T/R modules. Accordingly, any simplification of a module can have a major impact upon the cost and power requirements of the complete radar system.

The presently known optical distribution configuration for a phased array radar system requires optical sources at both the transmitter/receiver and at each T/R module. Attendant with each of these optical sources are temperature compensation and prime power systems.

Accordingly, any arrangement which reduces the complexity of the optical elements in the radar system or in particular avoids the need for an optical source in the T/R module, is of substantial value.

These and other objects of the invention are achieved in a radar apparatus comprising an array of M antenna elements, a radar transmitter, a source of an optical carrier, means to modulate the optical carrier by the transmitter signal and supply it to M separate optical paths, a radar receiver having a set of M optical inputs with demodulators for recovering M antenna returns from an optical carrier, and a set of M T/R modules each associated with an antenna element and each having a fiber optics input for connection to the transmitter and a fiber optics output port for connection to the receiver.

The apparatus further comprises a first set of M optical fibers for separately conveying the optical carrier bearing the transmitter signal (during the transmit period) to each T/R module, and a second set of M optical fibers for separately connecting the antenna signal from each antenna element, modulated on an optical carrier, to the receiver.

Each of the T/R modules further comprises a directional optical single pole double throw (SPDT) switch having a common port, a port selected during the receive period and a port selected during the transmit period. The optical carrier, modulated during the transmit period and unmodulated during the receive period is coupled to the common port of the switch.

An optical detector, coupled to the transmit port of the optical SPDT switch, recovers the transmitter signal from the optical carrier and a power amplifier amplifies the transmitter signal to a level suitable for application to an associated antenna element. A circulator couples the amplified transmitter signal to the associated antenna element during the transmit period, and couples the return from the associated antenna element to a low noise amplifier, which amplifies the return to a level suitable for subsequent processing during the receive period.

Finally an optical modulator, modulates the unmodulated optical carrier, available during the receive period from the STDT switch, by the amplified return. The optical carrier, modulated by the return is then coupled via the optical output port of the T/R module and one of the second set of optical fibers to the receiver.

The arrangement avoids the need for providing a separate laser for generating an optical carrier within the individual T/R modules for receive, and simplifies each module.

The reduction in the required number of lasers in a given system enhances the reliability of that system. Each module may be further simplified by selecting a single optical component for both the switching and the optical modulation functions.

SUMMARY OF THE INVENTION

Accordingly, it is an object of the present invention to provide an improved optical distribution system for transmit and receive signals in a phased array radar system.

It is another object of the invention to provide an optical distribution system for transmit and receive signals in a phased array radar system requiring minimum optical components.

It is still another object of the invention to provide an optical distribution system for transmit and receive signals in a phased array radar system in which one light source may be eliminated in the signal distribution paths associated with each antenna element of the array.

It is another object of the invention to provide an improved transmit/receive (T/R) module in a radar system employing optical paths for transmit and receive signals.

BRIEF DESCRIPTION OF THE DRAWINGS

The inventive and distinctive features of the invention are set forth in the claims of the present application. The invention itself, however, together with further objects and advantages thereof may best be understood by reference to the following description and accompanying drawings in which:

FIG. 3(A) is a simplified electrical block diagram of a portion of a novel phased array radar apparatus including an elemental T/R module coupled by means of optical paths to the centrally located transmitter and receiver, the arrangement eliminating the need for optical power sources at the T/R modules themselves.

DESCRIPTION OF THE PREFERRED EMBODIMENTS

Figure 1:
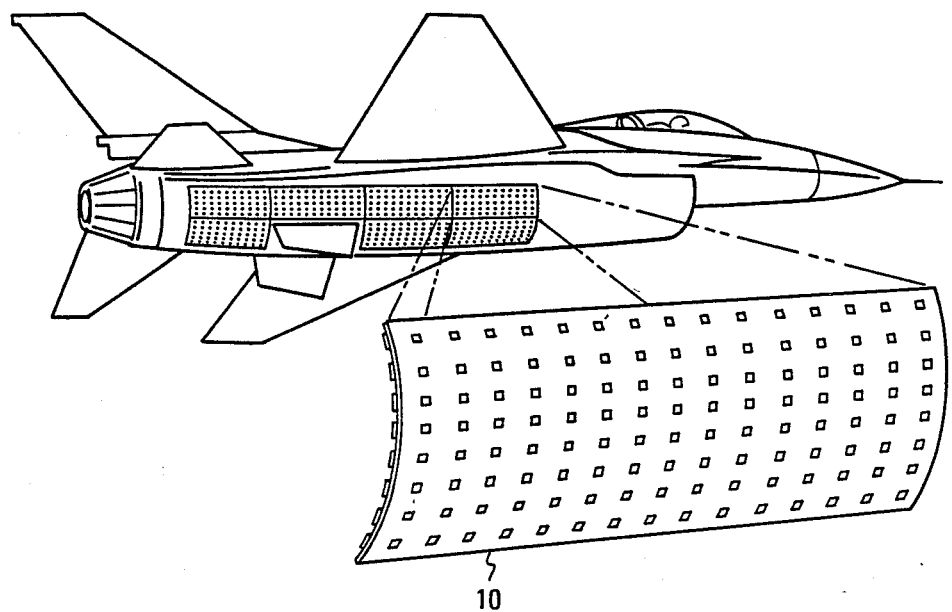
FIG. 1 is an illustration of an array having a low profile such as an array mounted on the surface of an aircraft, for which fiber optics may be used to advantage in RF signal distribution.

FIG. 1 is an illustration of a radar equipped aircraft employing a conformal array. The illustrated portion of the array consists of a generally rectangular distribution of antenna elements conforming to a curved surface and serving as the skin of the aircraft. Fiber optics signal distribution has particular advantage in arrays of this nature.

Figure 2:
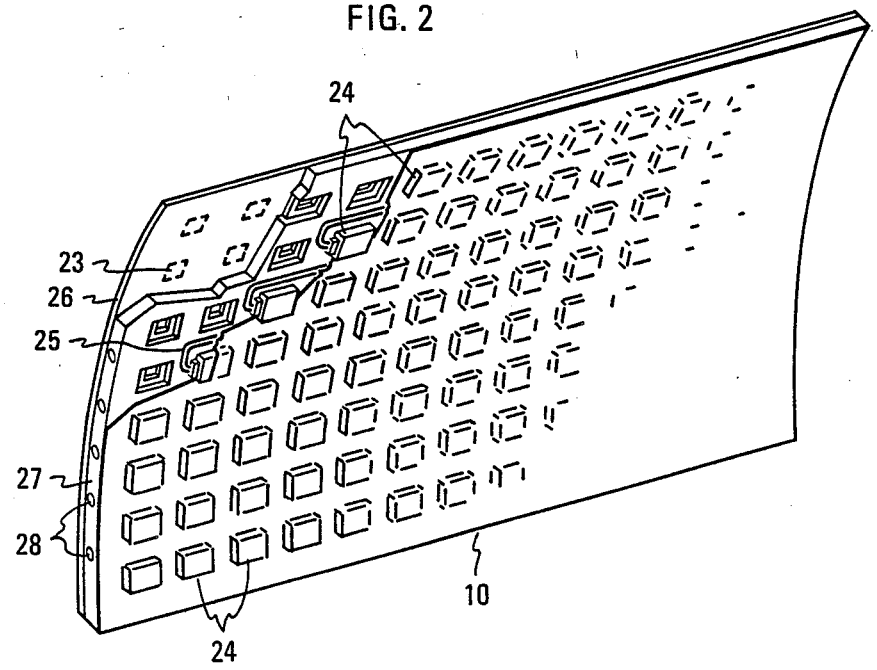
FIG. 2 is a more detailed illustration of the array illustrating the antenna elements, T/R modules associated with the antenna elements, and the positioning of optical fibres used for RF signal distribution between a centrally located transmitter and a receiver (not illustrated)

FIG. 2 is a more detailed illustration of the conformal array shown in FIG. 1. It illustrates individual antenna elements 23, T/R modules 24 associated with the antenna elements, and an interconnection harness 25, including fiber optic signal paths to the T/R modules. The fiber optic signal paths distribute the RF signal from a transmitter (not shown) placed at a convenient, and usually central location to the T/R modules and from the T/R modules to a receiver (not shown) usually placed in proximity to the transmitter. Both transmitter and receiver are assumed to be at some distance from the individual T/R modules because of the extended dimensions of a complete array, as well as the usually substantial distance of the array from a convenient location for the transmitter and receiver.

The panel 10, which is illustrated in FIG. 2 and which forms both the conformal array and the surface of the aircraft, is laminar in construction. The outer surface 26 is a dielectric layer upon which the antenna elements 23 are formed. The panel 10 includes an internal composite support structure 27 supporting the outer dielectric 26 and the T/R modules 24, and having integral thermal coolant passages 28. A flexible interconnection harness 25 contains the optical fibers plus conventional conductors for power and low frequency control signal distribution.

FIG. 3(A) is a simplified electrical block diagram of a portion of a phased array radar apparatus embodying the invention. A modulateable laser 1 with a bias supply, a single pole single throw (SPST) modulation selection switch 5, and an optical divider 3 are provided at the transmitter 2. During periods of transmission, the switch is closed and the transmit signal is superimposed on the bias, thus amplitude modulating the optical carrier. During periods of reception, the switch 5 is open so that the bias level of the optical source is constant and an unmodulated optical carrier results. The optical beam is then coupled to an optical divider 3, for distribution through a plurality of optical fiber paths 4, each path leading to a T/R module (24) located in proximity to an element of the array.

The T/R module operates with the antenna elements of the array. In the example, one T/R module is required for each antenna element. As the name "T/R module" implies, in transmit periods the T/R module drives the antenna elements with the optical paths (4) maintaining the phase accuracy between antenna elements necessary for beamforming. In receive periods, the T/R module amplifies the signal received by the antenna element and converts it to an optical format. The optical output of each T/R module is coupled via an optical fiber 6 to an optical detector and preamplifier 7 for connection to one port of an RF summing network 8 of a beamformer. Both elements 7 and 8 are associated with the receiver 9. During the receive period, the optical paths 6 maintain the phase accuracy between antenna elements necessary for beamforming.

Typically, the modulateable laser at the transmitter site is a solid state device which produces a few milliwatts of signal at a specific wavelength. The laser output, depending upon the power level, is then coupled by an optical divider to a plurality of elemental T/R modules 24. A practical number, using available solid state lasers and available dividers, lies between four and sixteen. The optical divider ma be a star coupler having a single fiber input and multiple fiber outputs, or a lens arrangement where the optical beam illuminates the exposed end of a fiber bundle. The use of an optical divider reduces the number of lasers required for a given sized array.

The number of modulateable lasers required for any phased array radar system is still large, with the present arrangement permitting a reduction due to the use of optical dividers and the elimination of lasers at the T/R modules. Assuming an optical division of eight, the quantity of lasers required for the entire array is reduced by a factor of sixteen.

The modulateable solid state laser of application to the present radar system operates at a specific wavelength, for instance in the vicinity of 850, 1300 or 1550 nanometers. The conventional method of modulation is linear amplitude modulation, achieved by varying the current through the diode junction. The RF modulation bandwidth currently achievable using this technique is in excess of several Gigahertz. The available bandwidth is expected to increase as the devices undergo further development.

The phase coherence required for beamforming the transmitted signal is achieved by control of the lengths of the RF paths from the radar transmitter 2 to the modulateable lasers 1, by control of the lengths of the optical paths 4 from the optical divider 3 to each elemental T/R module, and by control of the phase shifter 16 state within each module. Coherence is maintained between the RF transmitter signals for accurate beamforming without the requirement for coherence of the optical carriers between the large numbers of individual modulateable lasers. This is true because of the high stability of the individual lasers, and because the laser carrier frequency is several orders higher than the transmitting signal, making normal variations in optical phase of no practical significance.

During reception, the signal received from each antenna element appears in the output of each elemental T/R module 24, and is optically coupled by the optical fiber 6 to the detector 7 at the receiver. The receive signal is then coupled to one of the input ports of the RF summing network 8 which combines the signal from one antenna element with that from other antenna elements to produce a "beam formed" output to the receiver 9.

The phase coherence required for beamforming the received signal is maintained by control of the phase shifter 16 states and by control of the lengths of the optical paths 6 from each elemental T/R module via the detector/amplifier 7 to the RF summing network 8. It is not affected by the path lengths of the optical fiber 4 by which unmodulated light is brought to the modulator 22. As will be explained, during the reception period, the unmodulated laser 1 output, which appears within the T/R module, becomes the optical carrier subject to modulation by the received antenna signal. The stability of the individual lasers is sufficiently high and the antenna signal frequencies sufficiently low, that practical variations in optical phase between the lasers are of no consequence, and phase coherence of the received RF signal is preserved as long as the optical paths 6 are of accurate lengths.

The RF summing network may take any of several conventional forms. In a typical arrangement, the summing network is configured to sequentially process signals from the elemental T/R modules first in rows and secondly in columns. In addition, sum and difference beams may be formed for greater angular discrimination during reception. The invention is of general application and may be used in a variety of radar systems.

The transmit path within the T/R module entails the elements 13, 14, 15, 16, 17, 18, and 20. The element 13 is an optical switch or splitter coupled to the optical input port 11 to which transmitter modulated optical signals are supplied. The optical switch, as illustrated in FIG. 3(A), performs a single pole double throw function. The pole is coupled to the port 11 and the output terminal selected during the transmit period is optically coupled to an optical detector/amplifier 14.

A pair of ganged RF SPDT switches 15 and 17 are provide to insert a bidirectional phase shifter 16 into the transmit path or into the receive path to permit utilization in both modes of the module. To this end, a first terminal of the phase shifter is connected to the pole of the switch 15 and the second terminal of the phase shifter is connected to the pole of the second RF SPDT switch 17.

The transmit terminals of the switches 15 and 17 are connected respectively to the output of the optical detector/amplifier 14 and to the input of the power amplifier 18. The output of the power amplifier 18 is coupled via the circulator 20 to the antenna element 21.

The transmitter signal, during the transmit period, is thus modulated upon an optical carrier at the transmitter site, transmitted in the optical format to the T/R module 24, where it is returned to the RF format, then amplified, and then coupled to the antenna element 21 for radiation, the whole process maintaining RF phase coherence with the transmitter and with the other antenna elements forming the array.

The receive path within the module entails the elements 20, 19, 17, 16, 15, and 22 enumerated in the sequence experienced by a radar return. During the receive period, the antenna element 21 receives the transmitted pulse return and couples it via the circulator 20 to the low noise amplifier/variable gain amplifier 19. The output of the amplifiers 19 is coupled successively to the second RF switch 17 (at the receive terminal), to the phase shifter 16, to the first RF switch 15 (at the receive terminal), and thence to the modulating input terminal of the optical modulator 22.

During the receive period, the optical modulator 22 in the T/R module converts the return signal from the RF format to an optical format suitable for transmission in the fiber optical path 6 back to the receiver. In so doing, the unmodulated laser output is used as the optical carrier and the return signal as the source of modulation. The SPST switch 5 is open during the receive period, preventing modulation by the transmitter, and establishing a fixed bias on the diode laser 1. The fixed amplitude laser output, coupled via the optical fiber 4 appears at the optical input 11 of the T/R module. The SPDT optical switch 13 connects the unmodulated laser output via the receive terminal (R) to the optical input of the optical modulator 22, where it is modulated by the radar return, as noted earlier. The modulated optical signal is then coupled via the fiber optic link 6 to the optical detector/amplifier 7, and RF summing network 8 at the receiver.

In a practical embodiment of the FIG. 3A arrangement, optical paths leading from the light source 1 to the individual T/R modules, and from the T/R modules to the receiver 9, are of accurate length to achieve the phase accuracy required for beamforming during transmission and during reception. The beamforming during transmission may be provided by solely optical paths or by a combination of electrical and optical paths. Similarly, during reception, the beamforming may be provided by electrical paths, or by a combination of optical and electrical paths.

Figure 3C:
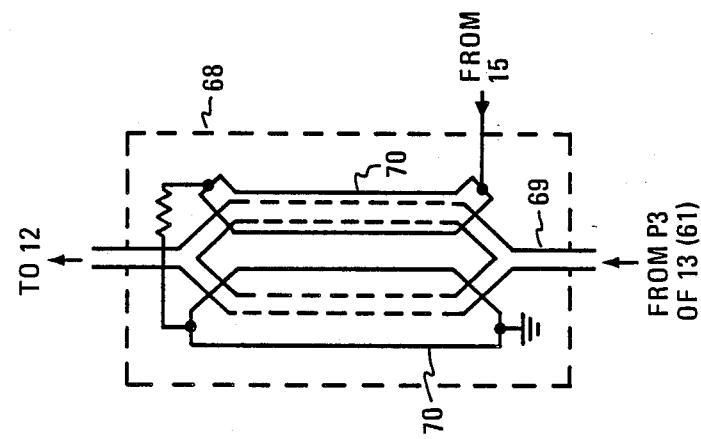
FIGS. 3(B) and 3(C) are illustration of typical optical switch and modulator components utilized in the T/R module.
Figure 3B:
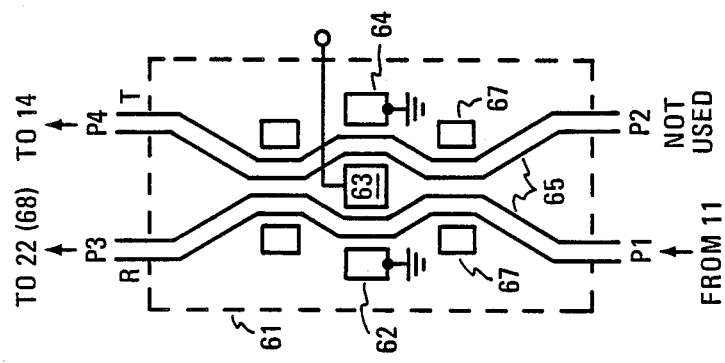

An electro-optic directional coupler 61, FIG. 3(B), may be employed for the switch 13. A suitable device, manufactured by Crystal Technology Inc., is produced by diffusing titanium into high purity lithium niobate substrates to form a pair of coupled optical waveguides 65. Electrodes, 62, 63, 64, deposited on the substrate surface, enable the application of an electric field which alters the guides propagation constants and therefore coupling. When used as a single pole double throw switch, the signal is applied to the input side of one of the optical guides, P1 or P2, while the output signal is selectably obtained at either of the guides' outputs, P3 or P4. When no voltage is applied to the electrodes, coupling between guides is maximum and the signal appears at the diagonal output of the other guide. When a sufficient voltage is applied, coupling between guides is minimized so that the signal appears at the output of the guide to which it is inputted. Tuning electrodes 66, 67 optimize the characteristics of the directional coupler for the optical wavelength of the laser source. The unused input (P2) of one of the guides need not be terminated, but may be capped to prevent admission of extraneous signals.

The directional coupler is switched at a relatively low frequency corresponding to the pulse repetition rate of the radar waveform. As FIG. 3(A) implies, RF switches 15 and 17 switch synchronously with the optical directional coupler.

A push-pull or Mach-Zehnder optical interferometric device, illustrated in FIG. 3(C), may be employed for amplitude modulating the optical carrier with the RF receive signal at 22. The modulator 68, produced similarly to the directional coupler, consists of a single input optical guide 69 which branches into two individual guides which are in turn recombined at the output. Electrodes 70 are deposited on the substrate surface in a manner such that when an RF signal is applied, the propagation constant and therefore optical phase is altered in one branch of the guide with respect to the other. Upon recombination of the branches, the optical signal will be amplitude modulated proportional to the RF signal.

Directional coupler switches and Mach-Zehnder modulators are capable of operation at RF frequencies in excess of 10 Gigahertz.

Figure 4:
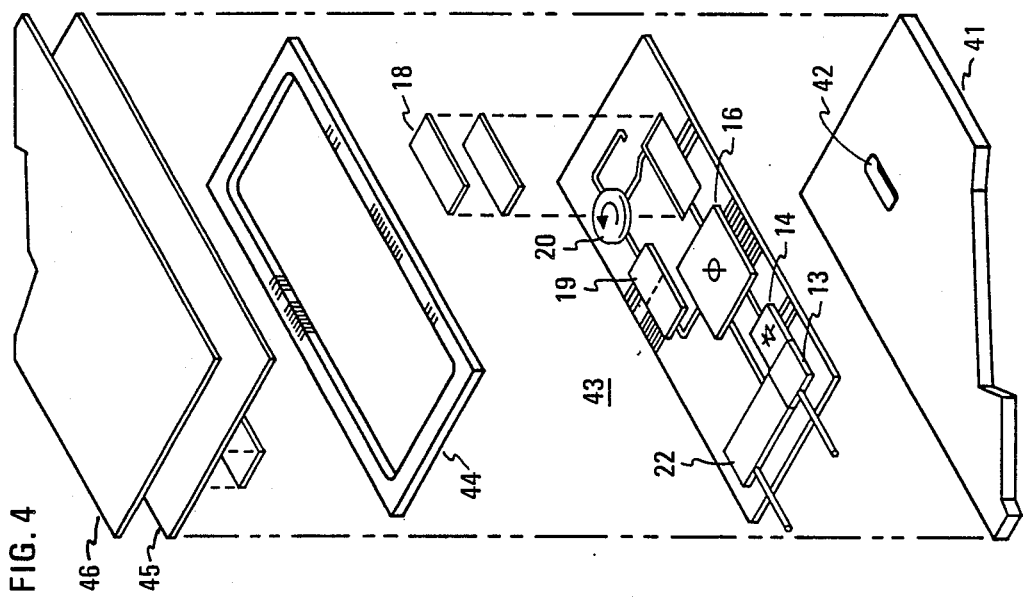
FIG. 4 is an exploded perspective block diagram of a T/R module designed for optical fiber signal distribution between the module and the transmitter and between the module and the receiver.

The physical configuration of a T/R module in accordance with the first embodiment is illustrated in the exploded view of FIG. 4. The assembly is fabricated on a stable metallic base 41 capable of solder assembly, and perforated at 42 for coupling to an antenna element. Circuit substrates 43, 45 of hybrid design supports the individual components of the module. In the figure, the optical SPDT switch 13, optical detector 14, phase shifter 16, power amplifier 18, circulator 20, receive amplifiers 19, and external modulator 22 are shown disposed and interconnected on the lower circuit substrate 43. A ceramic wall 44, sealed to the substrate 43, a second top level substrate 45 supporting additional control circuits, and a top metallic base 46 complete the package for the T/R module.

Figure 5A:
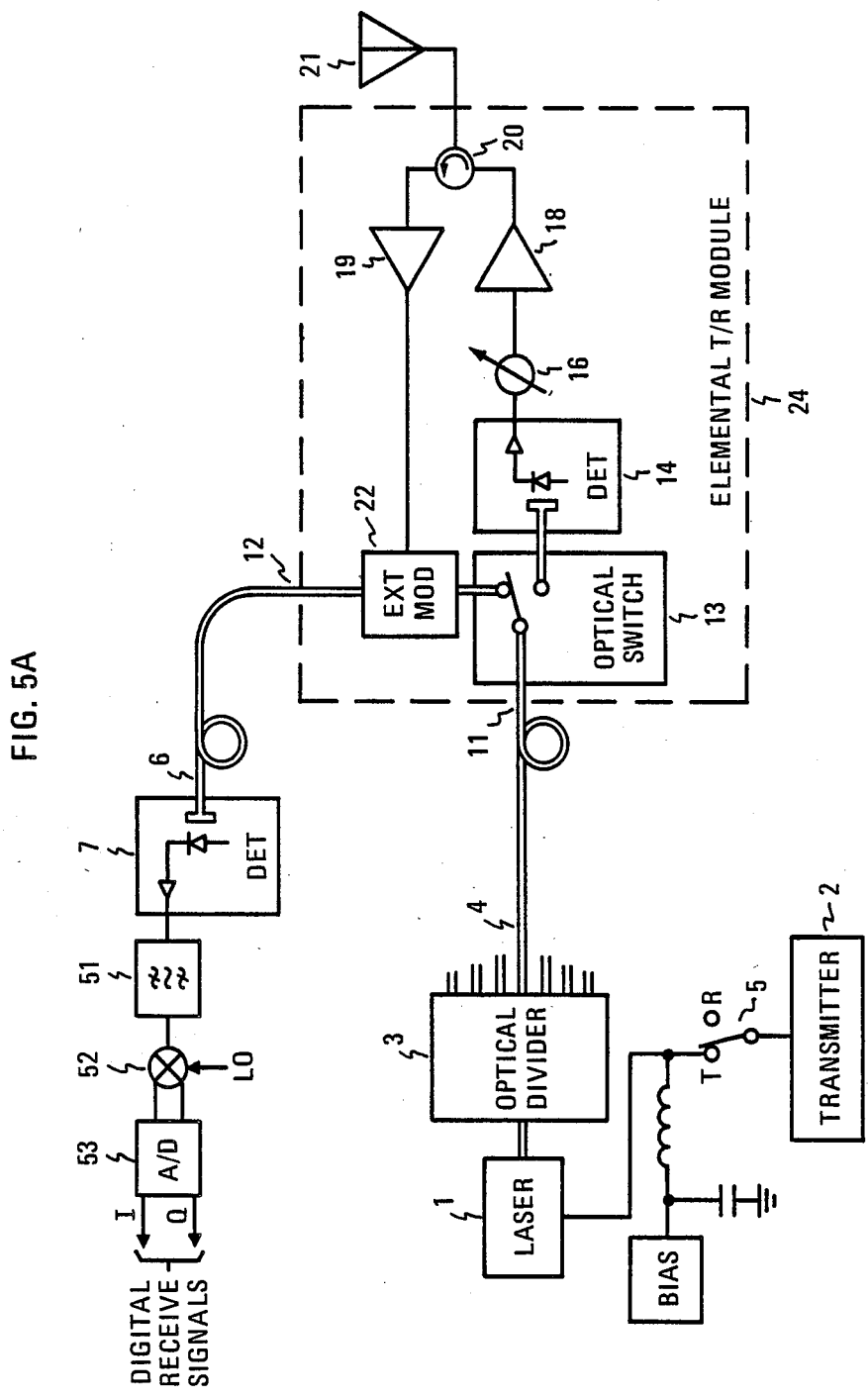
FIG. 5(A) is an illustration of a portion of a phased array radar apparatus using optical signal distribution in which the receive beamforming is performed in the digital domain.

The invention is also applicable to an arrangement performing digital receive beamforming. In the FIG. 5(A) arrangement, in which components similar to those in FIG. 3 bear the same reference numerals, digital beamforming occurs at the receive location. The receive signal, after low noise amplification, but without phase shifting is coupled to the modulation input of the optical modulator 22 for conversion into the optical format. The modulator output is then coupled via the fiber optic path 6 to the receive apparatus which includes an optical detector amplifier 7 (as in the prior embodiment), for recovering the signal at RF frequency. The RF signal is then applied to the band pass filter 51 for improving the signal to noise ratio, prior to synchronous detection in the detector 52. Synchronous detection obtains two quadrature related components retaining both phase and amplitude information in the receive signal. These components are then separately converted into digital format in the A/D converter 53. At this point the digital signal is in a form suitable for application to the digital receive beamforming apparatus where sum and difference beams may be created.

Figure 5B:
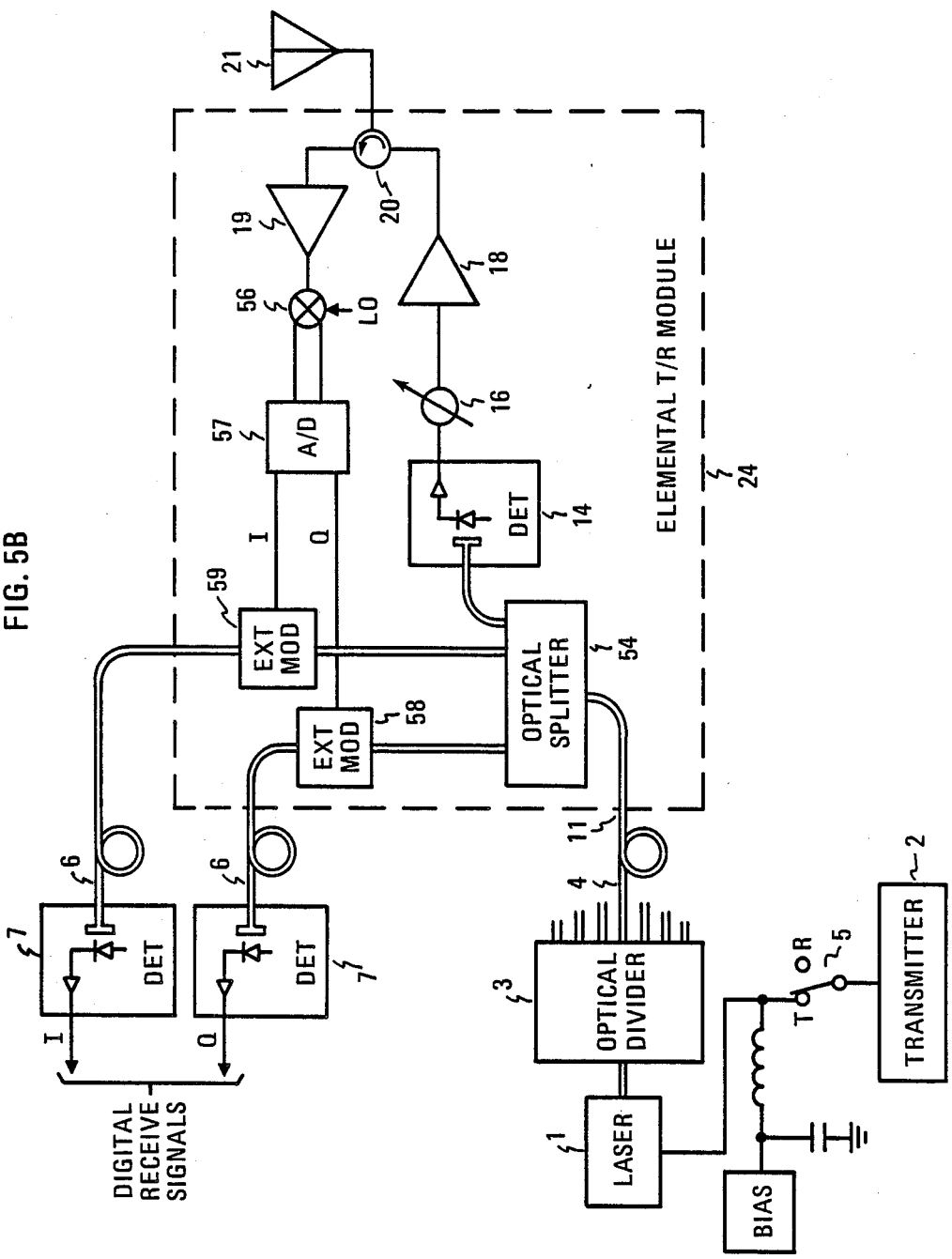
FIG. 5(B) is a further illustration of a portion of a phased array radar apparatus using optical signal distribution in which the receive signal is digitized within the elemental T/R modules.

A third variation in the role of a T/R module, using fiber optical signal distribution, is illustrated in FIG. 5(B). Here the receive signal is synchronously detected within the T/R module.

The optical transmit signal is coupled to the fiber optic input port of the T/R module, where the signal is split three ways by an optical splitter 54. One of the three outputs of the splitter is coupled to the detector amplifier 14 for conversion to the RF format transmit signal for the antenna feed. The output of 14 is then connected via the phase shifter 16 to the power amplifier 18. The amplifier output is then coupled via the circulator 20 to the antenna element 21.

During reception, the receive signal is digitally formatted. The receive signal is coupled via the circulator 20 and amplifiers 19 to the synchronous detector 56 for quadrature demodulation. The quadrature related components are separately converted to the digital format in the A/D converter 57. The separate digital I and Q signal components are coupled to the modulation signal terminals of the modulators 58, 59. The local oscillator signal can be distributed to the T/R modules by a second fiber optic link or they can be multiplexed in either the time, frequency, or polarization domain with the transmit signal on the fiber optic link.

Figure 6:
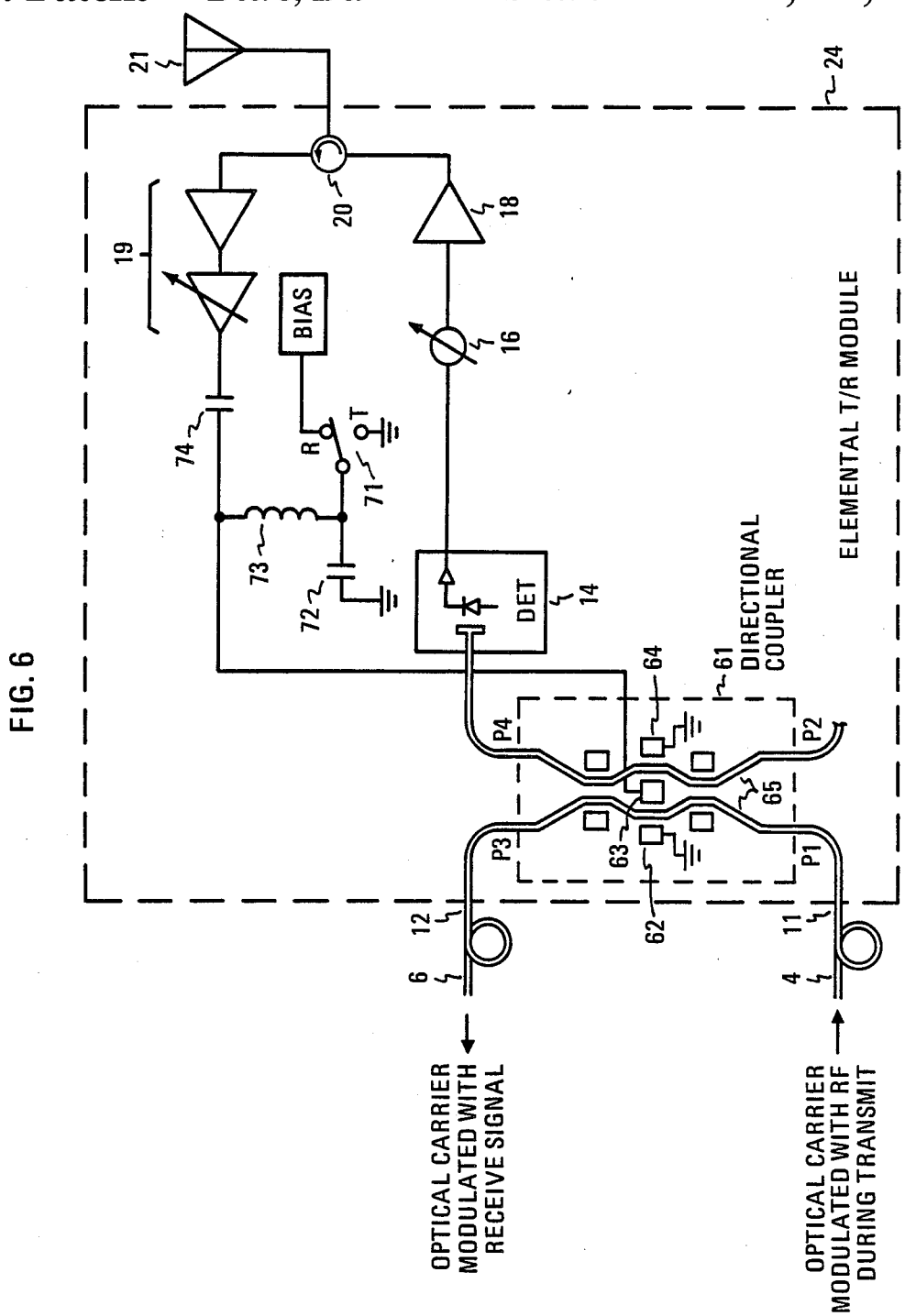
FIG. 6 is an illustration of a variation of the invention in which an external modulator of the directional coupler type provides both optical switching and modulation functions in an elemental T/R module, thereby further reducing the number of optical components required.

A further simplification in the T/R module with respect to the optical components may be achieved by consolidating the switching and modulation functions into a single optical device as depicted in FIG. 6. A suitable component is the electro-optic directional coupler operating as a switch during transmit, and operating in a linear mode as a modulator during receive. As shown in the figure, the device 61 using reference numerals similar to those employed in FIG. 3(B) is provided with three electrodes 62, 63, 64, with the electrodes 62 and 64 normally grounded.

A switch 71 together with RF trap network 72, 73 provides for altering the potential on electrode 63 between periods of transmission and reception.

During radar transmit periods, zero potential (ground state) is applied via switch 71 to electrode 63 of coupler 61. The optical carrier modulated with the transmit signal from the fiber 4 and inputted to port P1 of 61 is coupled entirely to port P4 where it is then applied to the components 14, 16, 18, 20, and to the antenna 21. Coupler port P2 is unconnected.

During radar receive periods, the transmit modulation is absent. An intermediate potential, which causes a partial coupling of the optical carrier inputted at port P1 to both ports P3 and P4, is applied to electrode 63 via switch 71. Superimposing the receive signal on this potential, via coupling capacitor 74, alters the optical coupling within 61 resulting in an optical carrier amplitude modulated by the receive signal at port P3. The modulated optical carrier at P3 is then directed via the optical port 12 of the T/R module to the fiber 6 for connection to the receiver.

A further advantage achieved due to consolidation of the optical switching and modulation functions, is an increase in the optical carrier level available during receive. A higher carrier level enables modulation by larger receive signals resulting in increased dynamic range and signal to noise ratios. Since the most significant contributors to optical signal attenuation are the optical components, as opposed to the fiber transmission media, any functional consolidation which allows for component elimination is beneficial to overall performance.

While providing substantial advantages in airborne application, the invention is also applicable to ground based radar systems.

What is claimed is:

1. A T/R module for an associated antenna element for use in a phased array radar apparatus having a transmitter and a receiver, said module comprising:
   (A) a fiber optics input port for receipt of an optical carrier modulated by transmitter signals during the transmit period and unmodulated during the receive period,
   (B) a fiber optics output port for supplying antenna signals modulating an optical carrier to a receiver during the receive period,
   (C) a directional optical single pole double throw (SPDT) switch having a common port, a port selected during the receive period and a port selected during the transmit period, the common port being coupled to said fiber optics input port,
   (D) an optical detector having its input coupled to the transmit port of said optical SPDT switch for recovering the transmitter signal from the optical carrier,
   (E) a power amplifier coupled to the output of said optical detector for amplifying the transmitter signal to a level suitable for application to the
   (F) a low noise amplifier for amplifying the signal received by the associated antenna element to a level suitable for subsequent processing,
   (G) means to couple said power amplifier to the associated antenna element during the transmit period, and to couple said associated antenna element to said low noise amplifier during the receive period, and
   (H) an optical modulator coupled to the receive output of said optical switch for receipt of the unmodulated optical carrier during the receive period, a modulating input coupled to the output of said low noise amplifier for modulating said optical carrier with said antenna signal, the optical carrier, modulated by said antenna signal, being coupled to said optical output port.

2. The T/R module set forth in claim 1 wherein said directional optical single pole double throw switch (C) and said optical detector (D) are provided by a single four port device having a first and a second pair of ports, the first ports of said first and second pairs being connected by a first optical guide and the second ports of said first and second pairs being connected by a second optical guide, a set of modulation electrodes, the potential of which determines the division of a signal supplied to a port in one pair between the port of the other pair associated with the same optical guide and the port of the other pair associated with the other optical guide,
   said fiber optics input port (A) being connected to the first port of said first pair, said fiber optics output port (B) being connected to one port of said second pair, the optical detector (D) being coupled to the remaining port of said second pair, said T/R module having in addition thereto:
   (I) a source of dc bias coupled to said set of modulation electrodes for coupling said transmitter signal to said optical detector during the transmit period, and
   (J) means to supply said antenna signal to said set of modulator electrodes to modulate said unmodulated optical carrier and couple the modulated carrier to said fiber optics output port (B) during the receive period.

3. The T/R module set forth in claim 1 having in addition thereto:
   (I) ganged first and second radio frequency (RF) SPDT switches, each RF switch having a common port for transmit/receive signals, a second port selected during the transmit period and a third port selected during the receive period,
   the transmit ports of said first and second RF switches being connected respectively to the optical detector output and to the input of said power amplifier and the receive ports of said second and first RF switches being connected respectively to the output of said low noise amplifier and the modulation input of said optical modulator, and
   (J) a bidirectional controllable phase shifter connected between the transmit/receive ports of said RF switches.

4. In a radar apparatus having an M-fold plurality of antenna elements, the combination comprising:
   (A) a radar transmitter providing an RF signal during the transmit period,
   (B) a source of an optical carrier,
   (C) means to modulate said optical carrier by said transmitter signal during the transmit period, said optical carrier being unmodulated during the receive period,
   (D) a first set of M optical fibers for coupling said optical carrier into M discrete optical paths leading from said transmitter to said M antenna elements
   (E) a radar receiver having M optical inputs,
   (F) a second set of M optical fibers for coupling signals from each of said M antenna elements to said receiver, and
   (G) a set of M T/R modules each comprising
      (1) a fiber optics input port coupled to one of said first set of optical fibers,
      (2) a fiber optics output port coupled to one of said second set of optical fibers,
      (3) a directional optical single pole double throw (SPDT) switch having a common port, a port selected during the receive period and a port selected during the transmit period, the common port being coupled to said fiber optics input port,

- (4) an optical detector having its input coupled to the transmit port of said optical SPDT switch for recovering the transmitter signal from the modulated optical carrier,
- (5) a power amplifier coupled to the output of said optical detector for amplifying the transmitter signal to a level suitable for application to the associated antenna element,
- (6) a low noise amplifier for amplifying the signal return from the associated antenna element to a level suitable for subsequent processing,
- (7) means to couple said power amplifier to the associated antenna element during the transmit period, and to couple said associated antenna element to said low noise amplifier during the receive period, and
- (8) an optical modulator coupled to the receive output of said optical switch for receipt of the unmodulated optical carrier during the receive period, a modulating input coupled to the output of said low noise amplifier for modulating said optical carrier with said antenna signal, the optical carrier, modulated by said antenna signal being coupled to said optical output port for connection to said receiver.

5. The combination set forth in claim 4 wherein said directional optical single pole double throw switch (G3) and said optical modulator (G8) are consolidated into a single four port device having:

a first and a second pair of ports, the first ports of said first and second pairs being connected by a first optical guide and the second ports of said first and second pairs being connected by a second optical guide, a set of modulation electrodes, the potential of which determine the division of a signal supplied to a port in one pair between the port of the other pair associated with the same optical guide and the port of the other pair associated with the other optical guide, said fiber optics input port (G1) being connected to the first port of said first pair, said fiber optics output port (G2) being connected to one port of said second pair, the optical detector (G4) being coupled to the remaining port of said second pair, and having in addition thereto:

a source of dc bias coupled to said modulation electrodes for coupling said transmitter signal to said optical detector during the transmit period, and means to supply said antenna signal to said modulator electrodes to modulate said unmodulated optical carrier and couple said modulator output to said fiber optics output port (G2) during the receive period.

6. The combination set forth in claim 4 having in addition thereto:

ganged first and second radio frequency (RF) SPDT switches, each RF switch having a common pole connected port for transmit/receive signals, a second port selected during the transmit period and a third port selected during the receive period, the transmit ports of said first and second RF switches being connected respectively to the optical detector output and to the input of said power amplifier, and the receive ports of said second and first RF switches being connected respectively to the output of said low noise amplifier and the modulation input of said optical modulator, and a bidirectional controllable phase shifter connected between the transmit/receive ports of said RF switches.

* * * * *